United States Patent [19]

Benoit

[11] 4,350,899
[45] Sep. 21, 1982

[54] LIGHTER THAN AIR WIND ENERGY CONVERSION SYSTEM UTILIZING A REARWARDLY MOUNTED INTERNAL RADIAL DISK DIFFUSER

[76] Inventor: William R. Benoit, 11718 Whittier Rd., Mitchelville, Md. 20716

[21] Appl. No.: 200,106

[22] Filed: Oct. 24, 1980

[51] Int. Cl.³ .............................................. F03D 9/00
[52] U.S. Cl. ....................................... 290/55; 290/44; 244/33
[58] Field of Search ...................... 290/44, 55; 244/30, 244/33, 73, 153 R, 155 R; 415/2

[56] References Cited

U.S. PATENT DOCUMENTS

| | | | |
|---|---|---|---|
| 1,717,552 | 6/1929 | Dunn | 290/44 UX |
| 2,384,893 | 9/1945 | Crook | 244/73 |
| 2,433,344 | 12/1947 | Crosby | 244/33 |
| 2,485,543 | 10/1949 | Andreau | 290/55 X |
| 2,784,556 | 3/1957 | Perdue | 290/55 X |
| 4,073,516 | 2/1978 | Kling | 290/55 |
| 4,166,596 | 9/1979 | Mouton, Jr. et al. | 290/55 X |
| 4,309,006 | 1/1982 | Biscomb | 290/55 X |

*Primary Examiner*—B. Dobeck
*Assistant Examiner*—W. E. Duncanson, Jr.
*Attorney, Agent, or Firm*—Nathan Edelberg; Robert P. Gibson; Saul Elbaum

[57] ABSTRACT

A lighter-than-air (LTA) wind energy conversion system (WECS) wherein a gas-filled LTA envelope carries a main rotor and electrical generator to take advantage of high wind speeds available at high altitudes. The LTA envelope is tethered to a ground based mooring system designed to provide self-orientation for the LTA envelope. In a preferred embodiment, heavy mechanical transmissions are eliminated by providing a radial disk diffuser within the rear portion of the frustrum-shaped LTA envelope. The diffuser is rotated through the drive shaft of a wind-driven external rotor. A linear duct is positioned within the envelope and has its rear outlet in fluid communiation with the gas inlet to the diffuser. Rotation of the rotor-diffuser drives an induction turbine positioned within the gas inlet of the duct at the fore portion of the envelope. The lifting gas for the envelope also serves as the working fluid for the turbine and is circulated by the diffuser-turbine action. The output of the induction turbine is coupled to an electrical generator whose output is, in turn, transmitted to the ground via the tethering system.

22 Claims, 4 Drawing Figures

LIGHTER THAN AIR WIND ENERGY CONVERSION SYSTEM UTILIZING A REARWARDLY MOUNTED INTERNAL RADIAL DISK DIFFUSER

RIGHTS OF THE GOVERNMENT

The invention described herein may be manufactured, used, amd licensed by or for the United States Government for governmental purposes without the payment to me of any royalty thereon.

BACKGROUND OF THE INVENTION

1. Field of the Invention

The present invention is related to wind energy conversion systems and, more particularly, is directed towards a wind energy conversion system which is carried aloft by a lighter-than-air structure.

2. Description of the Prior Art

The advent of fossil fuel shortages has stimulated the development of alternative energy sources, and in certain regions of the world wind energy conversion systems (WECS) are becoming more efficient and competitive in generating large amounts of electricity for residential or commercial use. Commercial versions of a WECS traditionally consist of a wind-driven rotor coupled to an electrical generator which are mounted on a tower to raise the large diameter rotor off the ground and as high in the wind regime as economically possible.

The major challenges to a designer of a WECS are the dilute concentration of energy in the wind as well as the intermittent nature of the wind. The lower power density of wind dictates that WECS of large size are required if sizable amounts of electrical power are to be generated. The intermittent nature of the wind normally results in the rendering of a WECS in an idle state much of the time. This has resulted in granting wind-generated electricity a value equal only to the fossil or nuclear fuel displaced with relatively little value granted for the capital equipment. This has seriously retarded commercial WECS development.

In addition, since the wind spectrum contains gusts and lulls, the stresses introduced into the rotor system of a WECS are large, and require rotor designs and support structures which are, to say the least, quite a challenge to the designer.

Since the power contained in the wind is a function of the cube of the velocity, the siting of a WECS becomes extremely important. Thus far, the best sites for a groundbased WECS have been on the coastlines in the northern hemisphere, as well as on mountain tops and hill tops. The latter elevations replace the high towers required to position the wind-driven rotor high enough to benefit from the velocity gradient of the wind. Unfortunately, the availability of prime high-altitude sites is severely limited, and although the cost of tower construction is greatly reduced for such sites, the expenses of road building, transporting the heavy components and subsequent erection of the WECS are high.

It is generally considered that WECS must be placed beyond the boundary layer portion of the wind in order to become inexpensive in terms of the energy yields. Additionally, a WECS must be designed to afford maximum protection against violent storms, which in the past have been primarily responsive for wind machine breakdown or destruction.

In addition to the inherent high cost attendant to the construction of a tower of sufficient height to position a large diameter (e.g., 300 foot) rotor, ground-based towers suffer from several other deficiencies. One deficiency is that there is a requirement for an open approach to the tower location, which leads to the desirability of utilizing higher altitude, but relatively inaccessible, bald hills for placement of a WECS tower. Further, construction of a tower necessarily results in a fixed height for the main rotor whose electrical generating capability is therefore at the mercy of the wind density at that particular height at any given point in time. Further, undesirable vibrations have been observed which result from what is referred to as "tower shadow" which occurs when the blade of the rotor passes adjacent the tower and sets up a type of vibratory forcing function effect. Additionally, there are inherent energy losses due to tower drag, and it is difficult to erect, service and maintain the equipment positioned on the top of the tower.

Due to gravity loads, there presently exists a practical maximum limit for the rotor diameter of approximately 300 feet. Further, a WECS having a 300 foot diameter rotor that produces 2.5 megawatts of electricity presently costs approximately $14 million and includes a massive transmission, drive shaft and heavy bearings which add significantly to the cost of the WECS as well as complicate the tower design upon which such a massive system must be positioned. For example, a mechanical transmission required for a 300 foot diameter rotor would weigh approximately 150-200 tons.

In addition to the foregoing drawbacks, a conventional WECS requires yaw motors, bull rings and the like, to turn the main rotor as the wind shifts direction. Such yaw motors and associated controls are expensive for large diameter rotors, must be operated at a slow rate in order to reduce gyroscopic loads, and add to maintenance and servicing problems.

There is a type of WECS which is known to obviate the need for a mechanical transmission. Such a WECS is known in the art as an Enfield-Andreau wind machine (see page 18 of "Wind Machines" by Frank R. Eldridge, The Mitre Corporation, October 1975). The Enfield-Andreau wind machine operates on a depression principle wherein the blades of the propeller are hollow and are provided with apertures at their tips. Generally, the interior of the blades communicate through an air passage in the hub of the propeller with the outlet of an air turbine which is coupled to an electric generator. When the wind velocity is of a value sufficient to cause rotation of the propeller, the air within the hollow blades is induced, by reason of the centrifugal force generated by its own mass, to flow out through the apertures in the blade tips thereby forming a depression (i.e., a pressure lower than that of the surrounding atmosphere) within the hollow blades. The air within the air turbine is then at a higher pressure than that of the air remaining within the blades, therefore establishing a continuous flow of air through the air turbine, the hub, the interiors of the blades and out through the apertures at the tips. The flow of air through the air turbine supplies power to drive the electric generator. A typical Enfield-Andreau WECS is set forth, for example, in U.S. Pat. No. 2,784,556 to Perdue. Such a ground-based system, however, still requires the propeller hub to be capable of rotation about a vertical axis in order that it may face into the wind. Additionally, a conventional Enfield-Andreau WECS requires the incoming air to make at least three 90° turns prior to expulsion through the propeller tips. Such a system inherently loses energy that it otherwise might have. Further, a ground-based Enfield-Andreau WECS suffers from the same deficiency set forth above with respect to other WECS, namely, the inability to take advantage of the high wind power densities found at considerable altitudes off the ground.

I am also aware of U.S. Pat. No. 4,073,516 which issued Feb. 14, 1978 to Kling. In this patent, the advantage of replacing a tower-based WECS with a gas-filled hollow body that carries a rotor assembly, current generator and alignment means is recognized. However, the apparatus disclosed in this patent for accomplishing these noteworthy objectives are complex. Initially, the system requires an alignment assembly for aligning the rotor to face into the wind, a ground anchor, and at least one captivating stay connecting the floating power plant to the anchor. The support body is connected to the captivating stay through a joint connection requiring three degrees of freedom. The rotors are gimbal-mounted at a variable relative position with respect to the support body but in fixed positions relative to one another. Additionally, the rotor assembly requires at least one pair of coaxially and coplanarly mounted counter-rotating rotors having their moments of momentum compensated. Again, while this patent does recognize the noteworthy advantage of elevating a wind-driven power plant into high-altitude winds by means of a lighter-than-air structure, the means for accomplishing same, it is felt, leaves much to be desired and may be impractical.

In one co-pending U.S. Patent Application of mine, filed concurrently herewith and entitled "A LIGHTER THAN AIR WIND ENERGY CONVERSION SYSTEM UTILIZING AN EXTERNAL RADIAL DISK DIFFUSER", I set forth the combination of a ligher-than-air wind energy conversion system wherein the LTA envelope carries a main rotor and electrical generator to take advantage of high wind speeds available at high altitudes. The heavy mechanical transmissions of the prior art are eliminated by providing a radial disk diffuser that rotates with the main rotor. Such rotation drives an induction turbine positioned within a substantially linear duct which is preferably located along the longitudinal axis of the LTA envelope. The apparatus set forth in this co-pending application takes advantage of, while improving upon, the depression turbine principles described above in connection with the Enfield-Andreau WECS.

While the design set forth in my co-pending application described above is an improvement over the prior art, there may be a few aspects of the design which may prove difficult from an engineering standpoint. One of these aspects is the provision of the longitudinal duct which extends along the centerline axis within the envelope whose front end forms a ram air inlet at the front of the envelope and whose rear end is in fluid communication with the rearwardly mounted disk diffuser. The front end of the duct, being open to the atmosphere, may be subjected to the possibility of ingress of debris, birds or other contaminating materials which could cause damage to the extraction turbine-generator structure positioned forwardly in the duct. Further, such debris could impede the efficient operation of the fluid-based system. Additionally, since the envelope around the duct contains a lighter-than-air gas, such as helium or hydrogen, highly effective seals need to be formed at both ends of the duct where it merges with the envelope structure. Such seals may be costly, as well as a source of potentially troublesome maintenance. Finally, the rotor-diffuser assembly, located at the rear of the envelope, does not weigh an insubstantial amount, and there may be some engineering difficulties in properly mounting the diffuser-rotor assembly to the rear of the duct as well as in maintaining balance of the overall structure.

To overcome the potential engineering problems set forth above, I have described in another co-pending U.S. Patent Application, also filed concurrently herewith and entitled "A LIGHTER THAN AIR WIND ENERGY CONVERSION SYSTEM UTILIZING AN INTERNAL RADIAL DISK DIFFUSER", an LTA-WECS wherein the radial disk diffuser is positioned within the forward portion of the LTA envelope. The diffuser is rotated through a drive shaft which extends down the longitudinal axis of the envelope to the externally mounted wind-driven rotor. The induction turbine is positioned within the gas inlet of the diffuser, the lifting gas for the envelope also serving as the working fluid for the turbine. In this manner, the longitudinal duct having a ram air inlet at the front of the envelope is obviated, and the externally mounted rotor diffuser assembly is dispensed with in favor of what is believed to be a more balanced weight distribution.

While the design set forth in my second co-pending application described above is believed an improvement over the prior art, there also may be a few aspects of the design which may prove difficult from an engineering standpoint. One of these aspects is that the diffuser-turbine assembly, being positioned within the nose cone of the envelope, may be confined within too small an area to provide proper diffuser effect for maximum efficiency. Further, this design requires a very long drive shaft and supporting bearings which may be subjected to undue stresses. The envelope required to lift and support such a system must be large, heavy and therefore relatively expensive. The size of the envelope necessary cascades through the rest of the design, requiring a long drive shaft, a plurality of support bearings, a relatively large rotor, and the like.

While the potential disadvantages pointed out above with respect to the devices set forth in both of my co-pending applications are not believed insurmountable or debilitating, it nevertheless would be highly desirable if such engineering problems could be overcome by an improved or different design. It is towards achieving this general objective that the present invention is advanced.

I am also aware of the following U.S. Patents which, together with the above-noted references, are considered by me to be the closest prior art to my invention: U.S. Pat. Nos. 1,717,552; 2,384,893; 2,433,344; and 3,936,652.

OBJECTS AND SUMMARY OF THE INVENTION

It is therefore a primary object of the present invention to provide a wind energy conversion system (WECS) which is coupled with a lighter-than-air (LTA) structure for taking advantage of high energy density winds at high altitudes in a more efficient and economical manner than heretofore possible.

Another general object of the present invention is to provide a wind energy conversion system which overcomes the disadvantages and deficiencies noted above with respect to prior art WECS structures.

A further general object of the present invention is to provide a wind energy conversion system which totally eliminates the complications associated with ground-based systems, including those associated with tower structure and cost.

An additional object of the present invention is to provide a wind energy conversion system which permits withdrawal of the system from the wind regime prior to the advent of a storm in order to protect the system against damage.

An additional object of the present invention is to provide a WECS which may be positioned in any desirable location, such as in a valley, off-shore, in marshland, and other locations heretofore thought inappropriate for an efficient WECS.

Another object of the present invention is to provide a wind energy conversion system in combination with a lighter-than-air structure which is self-orienting and includes aerodynamic damping of orientation motions.

An additional general object of the present invention is to provide a wind energy conversion system which is much more efficient and hence more economical than prior art systems, which greatly reduces stresses impinging on the rotor, and which is relatively easy to erect, maintain and service when compared to ground-based WECS.

An additional object of the present invention is to provide a wind energy conversion system which requires very little site preparation, has little impact on the environment, is virtually pollution-free, noise-free and is visually unobjectionable.

A further important object of the present invention is to provide an airborne wind energy conversion system which eliminates the need for a mechanical transmission and thereby greatly reduces the weight of the system required to be airborne.

Another important object of the present invention is to provide an LTA-WECS which can produce, for example, the same amount of electricity with a rotor of one-fourth the size of a ground-based WECS, or can achieve four times the power as may be obtained for the same size rotor on a tower-based WECS.

A still further object of the present invention is to provide a lighter-than-air wind energy conversion system which overcomes the potential disadvantages of the designs set forth in my co-pending applications discussed above which include, more particularly, those associated with sealing the duct-envelope interfaces, the externally and rearwardly-mounted diffuser, proper operation of the internal diffuser and elimination of the necessity for a large costly envelope and long drive shaft.

A still further object of the present invention is to provide an LTA-WECS which incorporates a diffuser gas pump positioned internally of the gas-filled envelope.

An additional object of the present invention is to provide a wind energy conversion system in a gas-filled lighter-than-air envelope which utilizes the lifting gas within the envelope as the working fluid to power the extraction turbine while still utilizing freestream air to power the main rotor.

Another object of the present invention is to provide a wind energy conversion system supported by a gas-filled, enclosed lighter-than-air vehicle within which much of the machinery is positioned and which eliminates the need for an elongated duct having a ram air inlet.

The foregoing and other objects are attained in accordance with one aspect of the present invention through the provision of apparatus which comprises a lighter-than-air structure including an enclosed gas-filled envelope and means supported by the lighter-than-air structure for generating electricity. Such means includes a main rotor adapted to be rotated by the wind, a diffuser mounted within the envelope and coupled to rotate with the main rotor, a hollow duct within the envelope and having an outlet end coupled to the diffuser, a turbine in fluid communication through the duct with the diffuser, and an electrical generator coupled to the turbine. Means are preferably connected between the lighter-than-air structure and the ground for tethering the structure and for delivering electricity from the generator.

In accordance with more specific aspects of the present invention, the diffuser includes a gas inlet coupled to the outlet end of the duct, a gas outlet, and a plurality of vanes, one end of each of the vanes positioned adjacent the gas inlet while the other end of each vane is positioned adjacent the gas outlet. The diffuser preferably further comprises a pair of cover plates between which the vanes are mounted, the gas inlet positioned in the center of one of the plates while the gas outlet is positioned on the periphery between the two plates. The vanes are preferably curved and extend radially outwardly from the gas inlet to the gas outlet. The main rotor preferably comprises a pair of rotor blades, and a drive shaft is provided to connect the rotor to the diffuser so that the diffuser rotates therewith. The duct is preferably an elongated substantially linear duct that extends along the axis of the envelope and includes an inlet end positioned adjacent the fore portion of the envelope.

The turbine is preferably positioned within the inlet end of the duct. The diffuser is adapted, upon rotation, to draw gas from the gas-filled envelope, through the inlet end of the duct and its gas inlet and expel same through its gas outlet. The turbine preferably includes impeller blade means adapted to be rotated by the gas drawn through the inlet end of the duct. The electrical generator may be positioned either forwardly or rearwardly of the turbine. An output shaft couples the turbine to the generator. The diffuser is preferably positioned in the rear portion of the envelope in a manner so as to more effectively utilize the entire gas-filled envelope as a plenum. The envelope may be advantageously shaped to include an aft conical frustrum.

Means in the form of suspension cables are preferably positioned at spaced locations along the duct for supporting same which are connected to the lighter-than-air structure. The means for supporting the duct may further include fore and aft rigid support struts extending from the framework of the lighter-than-air structure.

In the preferred embodiment, the main rotor is connected to the rear of the lighter than air structure and rotates in a plane which is substantially perpendicular to the longitudinal axis of the structure.

In accordance with other aspects of the present invention, the means connected between the lighter-than-air structure and the ground preferably comprises at least one tethering cable means and at least one electrical cable means. Preferably provided on the ground are means for mooring the cable means which includes means for selectively drawing in the cable means and thereby bringing the structure closer to the ground. More particularly, the cable means may include at least two cables one of which is connected to the fore portion of the structure, the mooring means including a beam which is pivotally coupled to a support pedestal and includes a cable connected preferably through a winch to each end thereof. In the LTA-WECS, the cables are connected to a pair of fore and aft outriggers that extend laterally from the lighter-than-air structure.

BRIEF DESCRIPTION OF THE DRAWINGS

The foregoing and other objects, aspects, uses and advantages of the present invention will become more fully appreciated as the same becomes better understood from the following detailed description of the present invention when considered in connection with the accompanying drawings, in which.

DETAILED DESCRIPTION OF THE PREFERRED EMBODIMENTS

Figure 1:
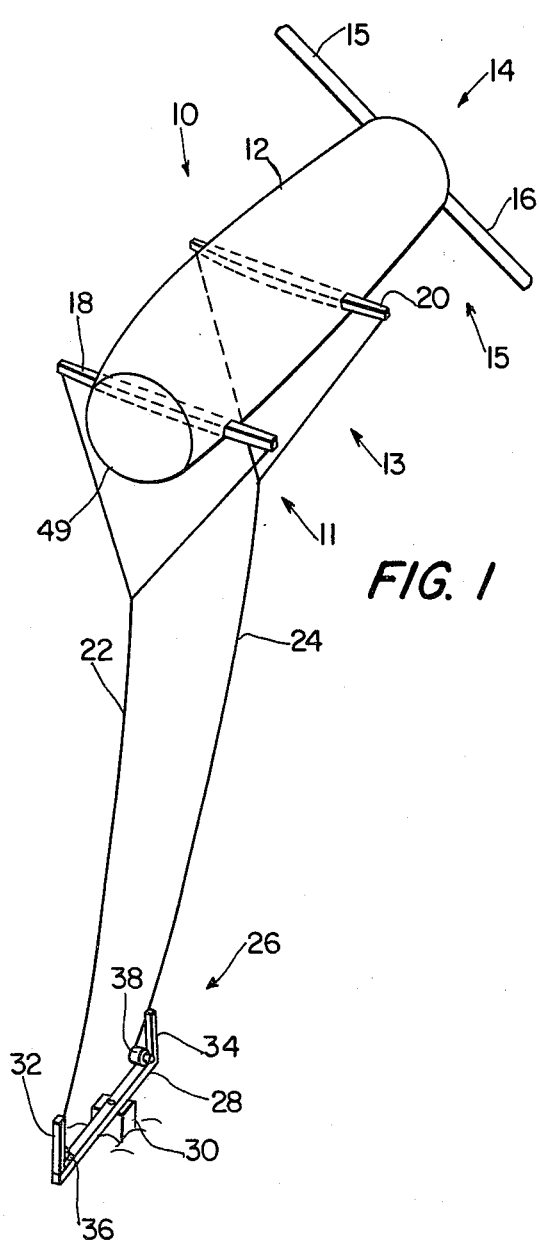
FIG. 1 is a perspective view of a preferred embodiment of the present invention.

Referring now to the drawings, wherein like reference numerals represent identical or corresponding parts throughout the several views, and more particularly to FIG. 1 thereof, reference numeral 10 indicates generally a preferred embodiment of a lighter-than-air wind energy conversion system (LTA-WECS) of the present invention.

The LTA-WECS 10 includes a lighter-than-air gas-filled enclosed envelope 12 which may be made of a rigid construction or of a flexible material such as a rubberized fabric of suitable properties on a rigid structure. A flexible construction reduces stresses, but may exhibit slightly higher drag than a rigid construction. Envelope 12 acts as a plenum in a manner to be described in greater detail below. Advantageously, the shape of envelope 12 is preferably designed so as to include a conical frustrum at the aft portion thereof, which is indicated generally in FIG. 1 by reference numeral 15. The fore portion 11 of the envelope 12 may be shaped as somewhat hemispherical, while the mid-portion 13 of envelope 12 may be somewhat cylindrical. The advantage of having a frustrum-like gear portion 15 will be set forth in greater detail below. Shown mounted on the rear portion of the envelope 12 is a wind-driven rotor 14. The main rotor 14 need not necessarily be mounted at the rear of envelope 12, but may be positioned in any suitable location.

Positioned in the fore portion of envelope 12 within nose cone 49 is an electrical generator (not shown in FIG. 1) which will be described in greater detail hereinafter.

Extending laterally from the body of envelope 12 are a pair of fore and aft outrigger assemblies 18 and 20. Connected to the ends of outriggers 18 and 20 are a pair of tethering cables 22 and 24, respectively. One of the tethering cables 22 and 24, or both, may include an electrical conductor for transmitting the energy output by the electrical generator to the ground. Of course, another function of cables 22 and 24 is to provide means for retaining the craft 10 at a desired altitude. Cables 22 and/or 24 may consist of a strong material, such as Kevlar ®, as an outer insulator for a center conductor, or separate tethering cables and electrical conductors may be provided, as may be desirable. Excess static lift provided by the LTA envelope 12 will keep tethering cables 22 and 24 taut and the LTA envelope 12 in the desired wind regime. While a single tethering cable may work as well, the double tethering arrangement illustrated in FIG. 1 is preferred since it will maintain the LTA envelope 12 rigidly in a horizontal position as the system 10 translates downwind and upwind. Preferably, the LTA envelope 12 is designed with its center of lift co-located with its center of gravity, one of the tethering cables such as 24 being attached just below the center of gravity. The cable tethering system illustrated in FIG. 1 allows the structure 12 to translate in the downwind direction when impacted by a gust, thereby relieving the stresses on the system 10. When the gust expires and the lull begins, the restoring force from the lift vector of the envelope 12 will translate the vehicle into the wind thereby regaining the energy of the gust. This feature results in a smoothing of the velocity profile of the wind and, therefore, smooths the stresses or loads on the rotor 14.

The lower ends of the tethering cables 22 and 24 are secured to a mooring system which is indicated generally by reference numeral 26. Although the mooring system 26 could take any of a number of forms, in the preferred embodiment, the mooring system 26 includes an elongated beam 28 which is pivotally coupled at its center point to a support pedestal 30 (e.g., concrete) which is affixed in the ground. A pair of mooring stanchions 32 and 34 are provided at the ends of beam 28 to permit the LTA envelope 12 to be secured during bad weather. For this purpose, a pair of winches 36 and 38, or the like, may be provided for drawing in cables 22 and 24, respectively.

the pivoting beam 28 allows the system 10 to be self-orienting without experiencing the undesirable dynamic interaction between the prior art tower and rotor (referred to as "wind shadow"). Since the tethering system requires no tower, "tower shadow" is no problem. The preferred embodiment of the invention achieves aerodynamic damping by the envelope 12 in both pitch and yaw. Roll damping will be provided by the cable tethering system, and self-orientation eliminates the need for yaw motors, yaw dampers, preload, ring gears, power to drive the yaw system, and associated inspection, repair and maintenance.

The stanchions 32 and 34 permit the airframe 12 to be rigidly connected to the beam 28 thereby permitting cable inspection, repair and maintenance to occur very easily. The loads on the beam 28 when the LTA envelope 12 is drawn down will be substantially identical to the loads when the LTA envelope 12 is aloft.

Figure 2:
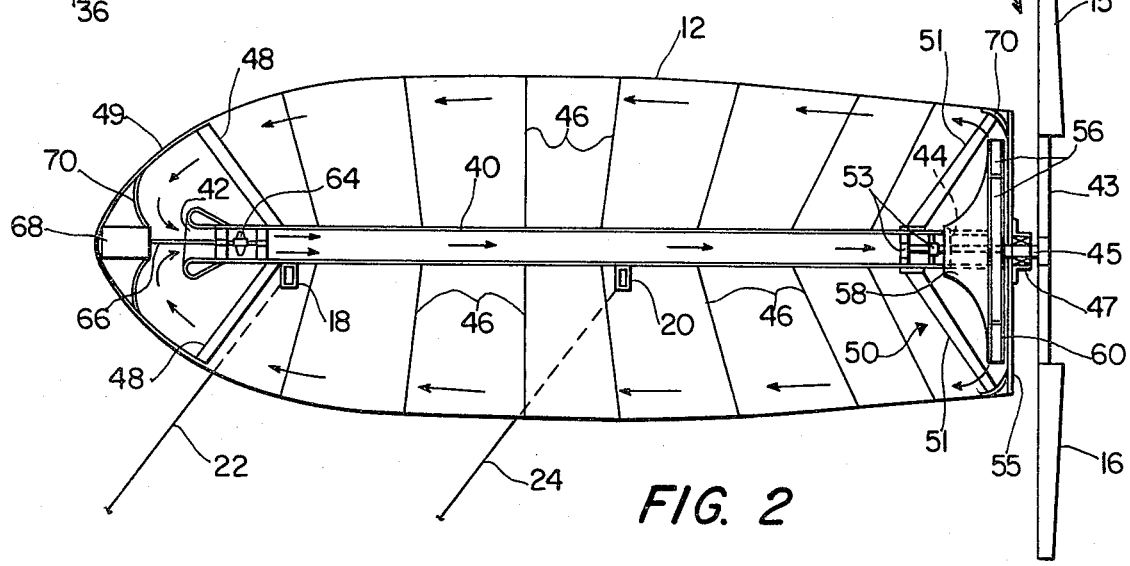
FIG. 2 is a longitudinal sectional view of the lighter-than-air structure of FIG. 1.

Referring now to FIG. 2, there is illustrated a longitudinal sectional view of the LTA envelope 12 of FIG. 1. Envelope 12 is preferably filled with helium, although other suitable lighter-than-air gases may be utilized.

The main rotor 14 includes conventional tapered rotor blades 15 and 16 which may be connected to a central drive shaft 45 by a spar 43. Extending down the longitudinal axis of and entirely within envelope 12 is a hollow duct 40, which may be supported by a plurality of spaced suspension hangers 46 which are affixed to the inside of the outer frame of envelope 12.

Duct 40 is preferably substantially linear and includes a gas inlet port 42 positioned adjacent the fore portion of envelope 12 within nose cone 49, and a gas outlet port 44. Duct 40 is preferably constructed of lightweight tubing such as aircraft aluminum, GRP, or other fiber-reinforced plastic. Connected between the framework of envelope 12 and the fore and aft portions of duct 40 are a set of forward struts 48 and rear struts 51, respectively. Strut structures 48 and 51 are preferably constructed in an open framework design to permit free flow of the lifting gas therethrough.

The drive shaft 45 of rotor 14 extends through an externally mounted bearing 47 connected to the rear wall 55 of envelope 12. The forward extension of drive shaft 45 may be supported by additional bearing assemblies 53 mounted in the aft portion of duct 40.

Affixed to the rear end of duct 40 and in fluid communication therewith is a radial disk diffuser indicated generally by reference numeral 50. Diffuser 50 is connected to rotate with shaft 45 and hence rotor 14, and acts as a speed increasing device, as will become more clear hereinafter.

Figure 3:
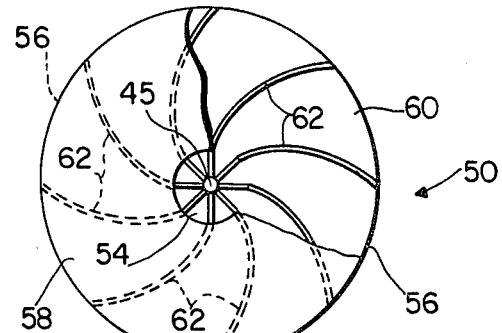
FIG. 3 is an enlarged, partially broken front view of a preferred embodiment of the radial disk diffuser illustrated in FIG. 2.

The radial disk diffuser 50 includes, as seen in FIGS. 2 and 3, a relatively small gas inlet opening 54 along with gas outlet ports 56 positioned on the periphery thereof. The inlet and outlet ports 54 and 56 are defined by a curved front plate 58 and a substantially flat rear plate 60. The fore portion of front plate 58 is curved forwardly to form the gas inlet opening 54, while the rear plate 60 may include a journal for coupling to the drive shaft 45 so as to rotate the diffuser 50 therewith.

The front and rear plates 58 and 60 enclose a plurality of curved radially extending vanes 62 which, together with plates 58 and 60, form fluid flow passages for the helium gas. Vanes 62 are preferably fastened between plates 58 and 60, and may be curved backwardly from their "normal" orientation to provide higher efficiency for the air pump or diffuser 50. The gas inlet 54 of diffuser 50 is coupled to the outlet end 44 of duct 40 so as to be in fluid communication therewith.

Positioned within the inlet end 42 of the duct 40 is a substantially conventional vaneaxial extraction turbine 64 which is adapted to be rotated by the circulating gas flow drawn through the inlet end 42 by diffuser 50. The impeller blades of turbine 64 may rotate in the opposite direction or in the same direction as diffuser 50, based upon an engineering analysis.

Connected to rotate with the impeller baldes of turbine 64 is an output shaft 66 which is coupled to an electric generator 68 mounted in the fore portion of nose cone 49. Inside nose cone 49 and adjacent rear wall 55 may be provided fluid guides 70 for smoothing the gas flow through the entire enclosed envelope 12 to thereby reduce losses and increase efficiency.

In operation, the freestream wind flowing around the LTA envelope 12 and through the rotor blades 15 and 16 cause rotation of the main rotor 14 and its direct-coupled drive shaft 45. The drive shaft 45 is, in turn, coupled to rotate the diffuser 50 which acts as a gas pump to circulate the lifting gas (e.g., helium) located within envelope 12 through the inlet 42, duct 40, gas inlet 54 and gas outlets 56. This gas flow, in turn, actuates the axial flow extraction turbine 64 which, in turn, rotates the generator shaft 66. In this manner, the generator 68 rotates at a high rpm to generate electricity which is transmitted to the ground via cable/connectors 22 and/or 24.

The extraction turbine 64 may comprise a motor/generator which allows an extremely light main rotor 14 of high-tip speed ratio and efficiency. Further, the working fluid for the main rotor 14 (air) has different properties from the working fluid for the diffuser 50 (helium). This difference allows higher rpms and therefore higher average efficiency. Furthermore, the diffuser 50 provides a flywheel effect which will smooth the entire dynamic system.

The provision of extraction turbine 64 as a motor/generator permits electric starting which allows the main rotor 14 to have a zero degree geometric pitch angle to yield a higher peak power coefficient and zero starting torque when stopped. This eliminates the need for pitch change mechanisms and speed brakes for overspeed. The lightweight rotor will advantageously provide a cascading weight reduction throughout the entire system.

The above-described suspension system for duct 40 relies upon the inertia of the envelope 12 (which includes the lifting gas) to damp the vibrational loads of the duct 40.

The present invention provides a helium environment for the entire mechanism except for the main rotor 14 and a small portion of the drive shaft 45 and bearing 47. Preferably, the exterior of the envelope 12 is treated with an appropriate environmental treatment.

Due to the recirculation of the lifting gas during operation, the apparatus of the present invention should provide long life due to the exclusion of moisture and debris and elimination of erosion problems. A simple pitot/static system may provide the input for the control system which would be exclusively fluidic except for electric starting and total shutdown. The apparatus is fire safe since the generator is immersed in helium.

The disk diffuser 50 is designed to reduce the weight of the device to allow same to take advantage of yet higher vertical wind velocity gradients. The disk diffuser 50 may be constructed of, for example, fiberglass to provide a lightweight, durable structure. Further, it may be appreciated that the inlet port 42 of duct 40 and the gas outlets 56 of diffuser 50 require only one 90° turn for the motive gas, greatly reducing flow losses associated with the prior art Enfield-Andreau WECS.

Figure 4:
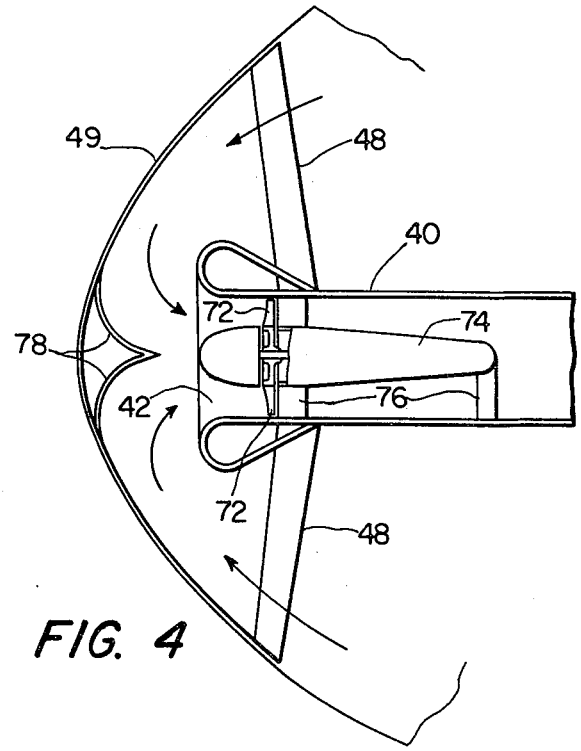
FIG. 4 is an enlarged, cut-away side view of an alternate arrangement of the turbine and generator of FIG. 2.

Referring now to FIG. 4, there is illustrated an alternate arrangement for the generator-turbine to that shown in FIG. 2. In FIG. 4, reference numeral 72 indicates the impeller blades of a vaneaxial extraction turbine, while reference numeral 74 indicates an aerodynamically-shaped rearwardly-mounted electric generator. Generator 74 may be supported by support struts 72, and the forward portion of nose cone 49 may include gas guide plates 78 for directing the lifting gas into the inlet port 42 of duct 40. Clearly, other possible configurations of the turbine and generator are within the scope of the present invention.

The frustrum-shaped rear portion 15 of envelope 12 results in a much more efficient envelope for the lifting gas than with my other designs (described in my co-pending applications discussed above), and importantly permits the radial diffuser 50 to be mounted aft. The aft mounting automatically provides the desired diffuser effect to the exiting gas from the diffuser outlets 56 after the gas makes its 90° turn from outlet port 44 of duct 40. This design results in a reduction in envelope materials and costs.

In comparison with a standard Goodyear ZP-3WA airship, having an envelope weight of 11,600 pounds, I have calculated that the weight of envelope 12 of the preferred embodiment would be far less, resulting in approximately an additional ton of static lift. Additionally, the overall length of the envelope 12 of the present invention would be approximately 46 percent shorter than that of the Goodyear envelope, which results in a cascading effect by eliminating a like amount of internal ducting, drive shaft, cable suspensions, and the like. The weight of the rotor, diffuser and generator would remain, however, approximately the same. The shape of the envelope 12 of the present invention costs 8 percent in envelope weight over an equivalent sphere, but with much better aerodynamics. The shape of the envelope 12 also provides for adequate directional stability.

Since the aerodynamic flow for the preferred embodiment replaces the standard mechanical transmission of many prior art WECS, the weight of such a transmission is eliminated. Since the weight of a transmission typically exceeds that of the rotor, hub and associated controls, the present invention represents a substantial weight savings. The high speed generator 68 is rather light when compared to standard generators used for wind turbines. The vaneaxial turbine 64 is preferably directly coupled to generator 68 via shaft 66, without requiring step-up gearing, the generator being operated at a synchronous speed with the rest of the power grid.

The mooring station 26 of the present invention may be located conveniently to the interface to the electrical power grid as long as the winds aloft are of sufficient average strength. Locations of the present invention in a valley, for example, are extremely attractive since same will provide maximum protection to the apparatus when it is retrieved in anticipation of a hurricane, for example. In a worst case storm, the envelope may be deflated. Dramatic savings may be realized with the present invention for off-shore sites that enjoy the most favorable wind regimes. WECS located off-shore may be tethered to anchors, for example, which would be much cheaper than floor-based tower structures. Additionally, off-shore WECS may be towed to their sites and can generate power during the process of towing. Assembly and check out may be accomplished at a shore station prior to towing. Additionally, maintenance, repair and modification may be done at the shore base. Clearly, the design of the present invention will not require structure to oppose the fury of sea waves during storms.

Environmentally, it is by now appreciated that windmills are non-polluting devices that, if efficient, can greatly assist the energy situation. Although the present invention is quiet compared to other mechanical equipment, the device may be placed high enough so that it would be soundless to personnel on the ground. Aesthetically, the invention is a dramatic improvement over conventional ground-based machines. The high altitudes and thin cables render a degree of near invisibility for personnel near the mooring site, and a reduction in apparent size for distant observers.

It may be appreciated that the present invention provides many solutions to the disadvantages and deficiencies of the prior art WECS. Since the surface-to-volume ratio of gas envelopes becomes more favorable with increased size, and because wind rotors become cheaper per square foot of swept area with increased size, an economical WECS according to the present invention will be quite large. For example, it is estimated that machines having 200 foot rotor diameters are feasible. Much larger sizes, capable of generating 10 megawatts, may also be achieved.

Obviously, numerous modifications and variations of the present invention are possible in light of the above teachings. For example, electric heaters could be provided for anti-ice and de-icing purposes. It is therefore to be understood that within the scope of the appended claims, the invention may be practiced otherwise than as specifically described herein.

I claim as my invention:

1. Apparatus, which comprises:
   a lighter than air structure including an enclosed gas-filled envelope;
   means supported by said lighter than air structure for generating electricity, said means including a main rotor adapted to be rotated by the wind, a diffuser mounted within said envelope and coupled to rotate with said main rotor, a hollow duct within said envelope and having an outlet end coupled to said diffuser, a turbine in fluid communication through said duct with said diffuser, and an electrical generator coupled to said turbine; and
   means connected between said lighter than air structure and the ground for tethering said structure and for delivering electricity from said generator.

2. The apparatus as set forth in claim 1, wherein said diffuser includes a gas inlet coupled to said outlet end of said duct and a gas outlet.

3. The apparatus as set forth in claim 2, wherein said diffuser comprises a plurality of vanes, one end of each of said vanes positioned near said gas inlet, the other end of each of said vanes positioned adjacent said gas outlet.

4. The apparatus as set forth in claim 3, wherein said diffuser further comprises a pair of cover plates between which said vanes are mounted, said gas inlet positioned in the center of one of said plates, said gas outlet located on the periphery thereof.

5. The apparatus as set forth in claim 4, wherein said vanes are curved and extend radially outwardly from said gas inlet to said gas outlet.

6. The apparatus as set forth in claim 5, wherein said main rotor comprises a pair of connected rotor blades, and further including a drive shaft extending through said envelope and connecting said rotor to said diffuser so that said diffuser rotates therewith.

7. The apparatus as set forth in claim 2, wherein said duct comprises an elongated duct extending substantially along the axis of said envelope and includes an inlet end positioned adjacent the fore portion of said envelope.

8. The apparatus as set forth in claim 7, wherein said turbine is positioned within said inlet end of said duct.

9. The apparatus as set forth in claim 8, wherein said diffuser is adapted, upon rotation thereof, to draw gas from said gas-filled envelope through said inlet end of said duct, through said gas inlet and expel same through said gas outlet.

10. The apparatus as set forth in claim 9, wherein said turbine includes impeller blade means adapted to be rotated by the gas drawn through said inlet end of said duct.

11. The apparatus as set forth in claim 10, wherein said electrical generator is positioned forwardly of said turbine.

12. The apparatus as set forth in claim 10, wherein said electrical generator is positioned rearwardly of said turbine within said duct.

13. The apparatus as set forth in claims 11 or 12, further comprising an output shaft coupling said turbine to said generator.

14. The apparatus as set forth in claim 7, further comprising means extending from said structure to said duct and positioned at spaced locations along said duct for supporting same.

15. The apparatus as set forth in claim 14, wherein said means for supporting said duct further includes fore and aft rigid support struts extending from said structure.

16. The apparatus as set forth in claims 1, 6 or 10, wherein said main rotor is connected to the rear of said envelope and rotates in a plane which is substantially perpendicular to the longitudinal axis of said envelope.

17. The apparatus as set forth in claim 1, wherein said means connected between said lighter than air structure and the ground comprises at least one tethering cable means and at least one electrical cable means.

18. The apparatus as set forth in claim 17, further comprising means positioned on the ground for mooring said cable means which includes means for selectively drawing in said cable means and thereby bringing said structure closer to the ground.

19. The apparatus as set forth in claim 18, wherein said cable means includes at least two cables, one of which is connected to the fore portion of said structure, said mooring means including a beam pivotally coupled to a support pedestal and having one of said cables connected to each end thereof.

20. The apparatus as set forth in claim 19, further comprising outriggers extending laterally from said lighter than air structure to which said cables are connected.

21. The apparatus as set forth in claims 1 or 6, wherein said diffuser is positioned in the rear portion of said envelope.

22. The apparatus as set forth in claim 21, wherein the rear portion of said envelope is shaped substantially in the form of a conical frustrum.

* * * * *